United States Patent
Mauramatsu

[11] 3,814,468
[45] June 4, 1974

[54] FLEXIBLE PIPE CONNECTOR

[75] Inventor: Tateo Mauramatsu, Yokohama, Japan

[73] Assignee: Bridgestone Tire Company Limited, Tokyo, Japan

[22] Filed: Aug. 2, 1971

[21] Appl. No.: 167,932

[30] Foreign Application Priority Data
Aug. 10, 1977 Japan.............................. 45-69294
Oct. 3, 1970 Japan.............................. 45-86957

[52] U.S. Cl............ 285/114, 285/235, 285/DIG. 16
[51] Int. Cl............................................. F16l 13/00
[58] Field of Search....... 285/114, 50, 49, 223, 235, 285/238, DIG. 16; 241/100.5

[56] References Cited
UNITED STATES PATENTS
| | | | |
|---|---|---|---|
| 2,001,573 | 5/1935 | Haushulter | 285/223 X |
| 2,504,634 | 4/1950 | Boschi | 285/223 X |
| 3,527,481 | 9/1970 | Lewis | 285/114 |
| 3,606,392 | 9/1971 | Garrett | 285/49 |

FOREIGN PATENTS OR APPLICATIONS
| | | | |
|---|---|---|---|
| 101,531 | 7/1937 | Australia | 285/50 |
| 119,704 | 3/1945 | Australia | 285/50 |
| 865,271 | 2/1941 | France | 285/114 |
| 859,242 | 12/1952 | Germany | 285/48 |
| 539,045 | 7/1955 | Belgium | 285/114 |

*Primary Examiner*—Dave W. Arola
*Attorney, Agent, or Firm*—Stevens, Davis, Miller & Mosher

[57] ABSTRACT

A flexible pipe connector comprising at least one metallic end cylinder connectible to at least one of two pipes to be connected, an intermediate metallic cylinder disposed between the pipes being connected, a thermally-adhesive rubber layer bonding said intermediate cylinder to said end cylinder, and a tension-limiting means secured to parts integral with the pipes being connected so as to limit the flexure of the connector when the load to it exceeds a certain limit.

3 Claims, 8 Drawing Figures

FLEXIBLE PIPE CONNECTOR

BACKGROUND OF THE INVENTION

This invention relates to a flexible pipe connector, and more particularly to a flexible connector of pipes for sand dredging and the like.

Generally speaking, conventional flexible pipe connecting tubes, such as sleeve joint hoses, for connecting cast-iron pipes for dredging sand or for land reclamation on water front or seashore, are usually made of rubber hoses having one or more reinforcing fabric or cord layers. Such known conventional flexible pipe connecting tubes have a shortcoming in that, when a very high tension is applied, they are susceptible to breakage and permanent elongation. Upon bending, the conventional connecting tubes tend to lose their flexible recovering power and they are likely to be permanently bent, so that sand flow through the bent connecting tubes tends to become turbulent. The turbulent sand flow causes localized wear and tear of the inside surface of the connecting tubes. If the connecting tube is folded or bent very sharply, the flow of sand stream through the connecting tube is blocked, so that the inside pressure of the connecting tube rapidly rises, and sometimes the connecting tube may be broken or exploded, so as to cause an unexpected accident.

The invention is an improvement in flexible connectors for connecting two axially aligned pipes, comprising two end flanges adapted for connection to facing ends of the pipes to be connected, an intermediate cylindrical member, at least one end tubular member which is integrally connected to at least one of the end flanges and arranged in use between the said intermediate cylindrical member and a pipe to be connected, the said intermediate cylindrical member being radially spaced from and arranged to axially overlap at least one said end tubular member, thermally-adhesive resilient rubbing bonding said intermediate cylindrical member to said end tubular member, said resilient rubber forming a flexible pipe extending between said two end flanges, and a plurality of flexible, tension-limiting restraining means such as chains or ropes each having one end connected to peripheral edge of the end tubular member secured to one pipe and the other end connected to either the facing peripheral edge of the end tubular member or the end flange secured to the other pipe.

BRIEF DESCRIPTION OF THE DRAWING

For a better understanding of the invention, reference is made to the accompanying drawings, in which.

Like parts are designated by like numerals and symbols throughout the drawings.

DESCRIPTION OF THE PREFERRED EMBODIMENT

Figure 1:
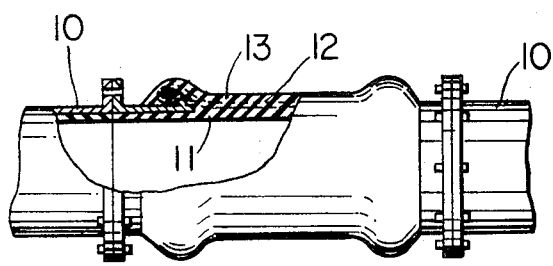
FIG. 1 is a side view, with a part in section, of a conventional pipe connector.
Figure 2:
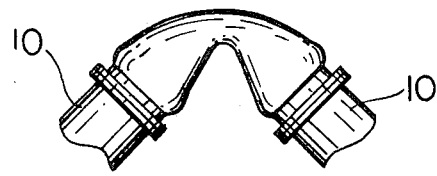
FIG. 2 is a schematic view, illustrating the bent condition of the pipe connector of FIG. 1.

Referring to FIG. 1, illustrating a conventional connector, e.g., the so-called sleeve joint hose, connecting sand draining iron pipes 10 for dredging and land reclamation on water front or seashore comprises a connector body having an inner rubber layer 11, a reinforcing cord layer 12, and an outer rubber layer 13, which body has a pair of connecting flanges secured to the opposite ends of the body, respectively, so as to facilitate the connection of the pipes 10 to the connector. Thus, the connector construction is complicated and difficult to manufacture, and its manufacturing cost is comparatively high. Furthermore, upon application of a comparatively high tension or bending moment, the conventional connector is easily susceptible to permanent elongation or permanent bent, as shown in FIG. 2. If the connector body is held in the bent condition for any extended period of time, as shown in FIG. 2, the fluid flow through the connector is blocked, so that the internal pressure of the connector suddenly rises, and the connector is exposed to localized quick abrasion or even to explosion in the worst case.

Therefore, an object of the present invention is to mitigate such difficulties of known pipe connector, by providing a flexible pipe connector having high freedom of flexure in the axial and eccentric direction. The pipe connector of the present invention also has a high tensile strength and a high pressure-resistivity, as well as a high flexible pipe connector according to the present invention comprises a pair of end cylinders 1, 2, each having a connecting flange 6 engageable with an iron pipe 10 to be connected, and a large-diameter end tubular members 7 an intermediate cylinder 3 extending across the facing large-diameter end tubular members 7 of the two end cylinders 1 and 2, a thermally-adhesive resilient rubber layer 4 bonding the intermediate cylinder 3 to the end cylinders 1 and 2, and a tension-limiting means 5 consisting of a plurality of chains, each being secured to the peripheral edges of the large-diameter end tubular members 7 of the end cylinders 1 and 2 at the opposite ends thereof. In the embodiment of FIGS. 3 to 7, the chains in the tension-limiting means 5 can be replaced with suitable ropes having a limited length and similarly secured to the end cylinders 1 and 2. The construction of the tension-limiting means 5, however, is not restricted to such chains and ropes, as will be described hereinafter. Opposite ends of the intermediate cylinder 3 is rapidly inwardly spaced from the wall of the large-diameter end tubular members 7 by a distance $d$, but the opposite ends are overlapped with the corresponding large-diameter end tubular members 7 by a length $l$, respectively. The intermediate cylinder 3 is embedded in the thermally-adhesive rubber layer 4 in such a manner that an inner rubber layer 8 is formed on the inner surface of the intermediate cylinder 3 so as to face the longitudinal axis of the connector. In the embodiment of FIG. 5, the entire peripheral wall of each cylinder 1 or 2 fulfills the functions of the end tubular member 7 of the preceding embodiment of FIG. 3.

It is apparent to those skilled in the art that the axes of the two end cylinders must be aligned with each other, and the intermediate cylinder 3 must be coaxially disposed with the end cylinders 1 and 2, in order to connect the two pipes 10 by the connector. The connecting flanges 6 are not essential in the pipe connector according to the present invention. In fact, the two end cylinders 1 and 2 may be directly welded to pipes 10 to be connected, when it is desirable to do so.

Figure 3:
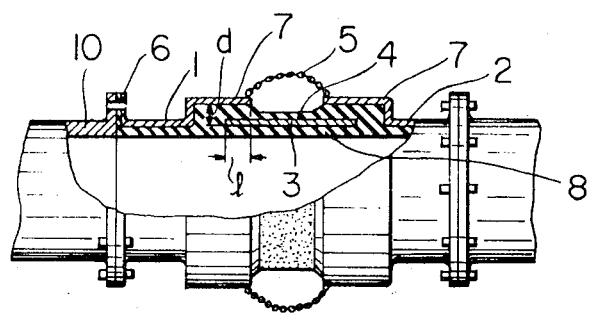
FIG. 3 is a partially cutaway side elevation of a flexible pipe connector, according to the present invention.

FIG. 5 illustrates a simplification of the embodiment of FIG. 3 by using end cylinders 1, 2, each having a connecting flange 6 carrying a nut 9 welded to the inner side surface thereof. With the nuts 9 thus welded, the overall length of the pipe connector is shortened and the appearance of the pipe connector is simplified.

Figure 6:
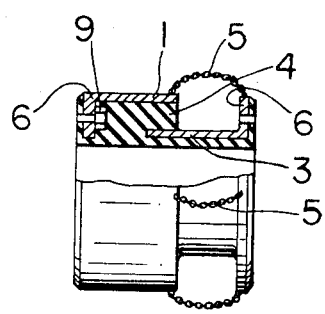

FIG. 6 illustrates a modification of the embodiment, as illustrated in FIG. 3, by using an intermediate cylinder 3 having a connecting flange 6 integrally secured thereto, so as to eliminate one of the two end cylinders of the preceding embodiment. With only one end cylinder, the construction and the appearance of the pipe connector according to the present invention is greatly simplified, and the length of the pipe connector is shortened. The tension-limiting means 5 are secured to the end cylinder 1 at one end thereof and to the connecting flange 6 of the intermediate cylinder 3, respectively.

Figure 7:
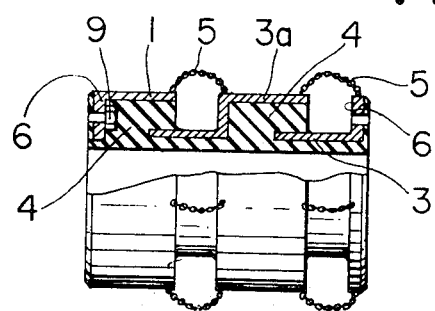

In the embodiment of FIG. 7, an additional intermediate cylinder 3a is used which has a small-diameter portion coacting with an end cylinder and a large-diameter portion coacting with a first intermediate cylinder 3 similar to the intermediate cylinder 3 of FIG. 6. The small-diameter portion of the additional intermediate cylinder 3a and the first intermediate cylinder 3 are radially spaced from the coacting end cylinder 1 and the large-diameter portion of the additional intermediate cylinder but partially overlapped therewith, as shown in FIG. 7. With the additional intermediate cylinder 3a, the pipe connector according to the present invention can be bent to a larger extent, as compared with the preceding embodiment which has only one intermediate cylinder 3. In each of the embodiments of FIGS. 6 and 7, the entire peripheral wall of the cylinder 1 fulfills the functions of the end tubular member 7 of the embodiment as described hereinbefore by referring to FIG. 3.

Figure 4:
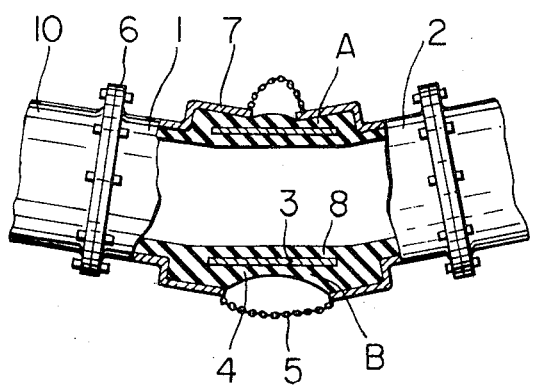
FIG. 4 is a side view, with a part in section, showing the pipe connector of FIG. 3 in bent condition.
Figure 5:
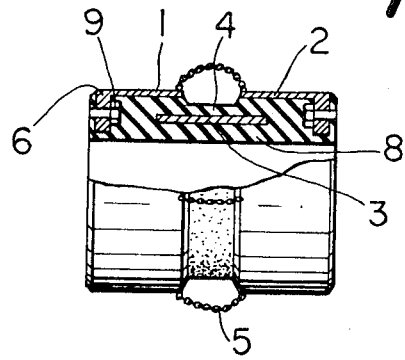
FIGS. 5 to 7 are partially cutaway side views of three different modifications of the flexible pipe connector of FIG. 3, according to the present invention.

With the aforesaid construction of the pipe connector, when the two pipes 10 connected by the connector is bent or deviated from mutual alignment, the resilient rubber layer 4 is flexed, as shown in FIG. 4. In the figure, a portion A of the rubber layer 4 is compressed, while another portion B of the rubber layer is stretched. At the portion A, the large-diameter portions 7 of the end cylinders 1, 2 approach the intermediate cylinder 3, while at the portion B, the large-diameter portions 7 move away from the intermediate cylinder 3. When the two pipes 10 are bent in excess of a certain limit, the tension-limiting means 5 is stretched taut, so as to prevent the two pipes 10 from being bent any further. Thus, a pipe line consisting of a plurality of such pipe connectors is expected to be bent smoothly.

Figure 8:
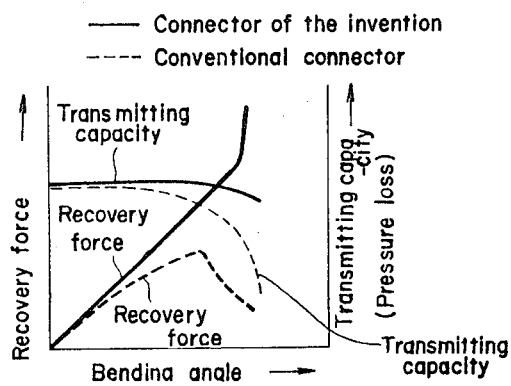
FIG. 8 is a graph, showing the performance characteristics of the pipe connector of the present invention, in comparison with that of a conventional pipe connector.

The recovering force of the pipe connector of the invention from a bent position increases with the bending angle, until the tension-limiting means 5 is fully stretched, as shown by thin solid lines in FIG. 8. Accordingly, the pipe connector of the present invention resumes its no-load position upon removal of an external force causing the pipes to bend relative to each other. On the other hand, with conventional pipe connectors, the recovering force is reduced when the bending angle exceeds a certain limit, as shown by thin dotted lines in FIG. 8. As a result, the conventional pipe connector tends to remain as bent when a large external bending force is applied thereto, as shown in FIG. 2.

It is apparent that the tension-limiting means 5 extending across the two pipes is stretched to its full rectilinear length upon application of a large tensile load to the corresponding portion of the pipe connector, so as to prevent the resilient rubber from being damaged by such large tensile load. Accordingly, the risk of permanent elongation and breakage of such pipe connector is completely eliminated.

Due to the presence of the aforesaid tension-limiting means 5, the change in the effective sectional area of the pipe connector is limited to be small when it is bent, so as to maintain a high transmitting capacity, as shown by thick solid lines in FIG. 8. On the other hand, conventional pipe connectors are susceptible to breakage due to the high tension, and an almost complete loss of the transmitting capacity will be caused, as shown by thick dotted lines of FIG. 8.

With the preceding embodiment of the flexible pipe connector according to the present invention, as illustrated in FIGS. 3 to 7, the construction consisting of the end cylinder or cylinders and the intermediate cylinder secured to the end cylinder by resilient rubber layer ensures the high pressure resistivity of the pipe connector and simplifies the manufacturing process, so as to cut down the production cost thereof. In operation, the preceding embodiments of the present invention have a large capacity of absorbing bending and eccentric load thereto, and the smallness of the cross sectional area reduction of the pipe connector at the time of bending ensures smooth flow through the connector for maintaining a high transmitting capacity therethrough. In addition, the pipe connector according to the present invention is simple in construction and small in size.

What is claimed is:
1. A flexible pipe connector for connecting two axially aligned pipes, comprising
two end flanges adapted for connection to facing ends of the pipes to be connected,
an intermediate cylindrical member,
two end tubular members which are integrally connected to said end flanges and arranged in use between said intermediate cylindrical member and a pipe to be connected, said intermediate cylinder being radially spaced from and axially overlapping said end tubular members, thermally-adhesive resilient rubber bonding said intermediate cylindrical member to said end tubular members, said resilient rubber forming a flexible pipe extending between and to said two end flanges being sealingly connected thereto, and a plurality of chainlike means each having one end connected to the inner axial peripheral edge of the end tubular member secured to one pipe and the other end connected to the opposing inner axial peripheral edge of the end tubular member secured to the other pipe.

2. A flexible pipe connector as set forth in claim 1, wherein each said end tubular member has a reduced diameter portion, and each said end flange extends outwardly from the outer peripheral surface of the reduced diameter portion of the end tubular member.

3. A flexible pipe connector as set forth in claim 1, wherein each said end flange extends inwardly from the peripheral wall of the said end tubular member.

* * * * *